United States Patent [19]

Silva et al.

[11] Patent Number: 5,388,848
[45] Date of Patent: Feb. 14, 1995

[54] MOTORCYCLE KICK STAND

[76] Inventors: Leroy F. Silva; Darwayne Fisher, both of 1643 E. Alisal St., Salinas, Calif. 93905

[21] Appl. No.: 89,283

[22] Filed: Jul. 12, 1993

[51] Int. Cl.$^6$ ............................................. B62H 1/06
[52] U.S. Cl. .................................. 280/300; 280/303; 280/304
[58] Field of Search ............... 280/302, 301, 303, 304, 280/298, 299, 300, 297, 293; 248/352, 354.5, 188.5

[56] References Cited

U.S. PATENT DOCUMENTS

| | | | |
|---|---|---|---|
| 514,044 | 2/1894 | Sherwood | 280/301 |
| 1,143,780 | 6/1915 | Pinto | 280/298 |
| 1,338,029 | 4/1920 | Lydecker | 280/299 |
| 2,791,441 | 5/1957 | Phillips | 280/302 |
| 3,591,202 | 7/1971 | Larsen | 280/303 |
| 4,580,804 | 4/1986 | Weber | 280/300 |

FOREIGN PATENT DOCUMENTS

| | | | |
|---|---|---|---|
| 3727725 | 8/1987 | Germany | 280/293 |
| 0453742 | 12/1949 | Italy | 280/304 |

*Primary Examiner*—Karin L. Tyson
*Assistant Examiner*—Anne Marie Boehler

[57] ABSTRACT

A new and improved kick stand apparatus for a two-wheeled vehicle, such as motorcycle, includes respective independently operable, first and second leg assemblies, each respective leg assembly being connected to the vehicle and capable of being placed in a lowered position or in a retracted position by an operator's foot. The kick stand apparatus is for preventing the motorcycle from falling onto one side or the other when the motorcycle is parked. When both the first leg assembly and the second leg assembly are in a lowered position, together they are capable of maintaining the parked motorcycle in an upright orientation. In employing the apparatus, a leg member of the first leg assembly is lowered from a retracted position. The motorcycle is leaned toward the lowered leg member of the first leg assembly, and the motorcycle is permitted to rest in a first rest position upon a foot of the first leg assembly. Then, a leg member of the second leg assembly is lowered from a retracted position. Then, using a sideways rocking motion, the motorcycle is moved from the first rest position to a second rest position wherein the motorcycle rests upon both the lowered leg member of the second leg assembly and the lowered leg member of the first leg assembly. In the second rest position, the motorcycle is maintained in an upright orientation by the lowered leg members of both the first and second leg assemblies.

8 Claims, 4 Drawing Sheets

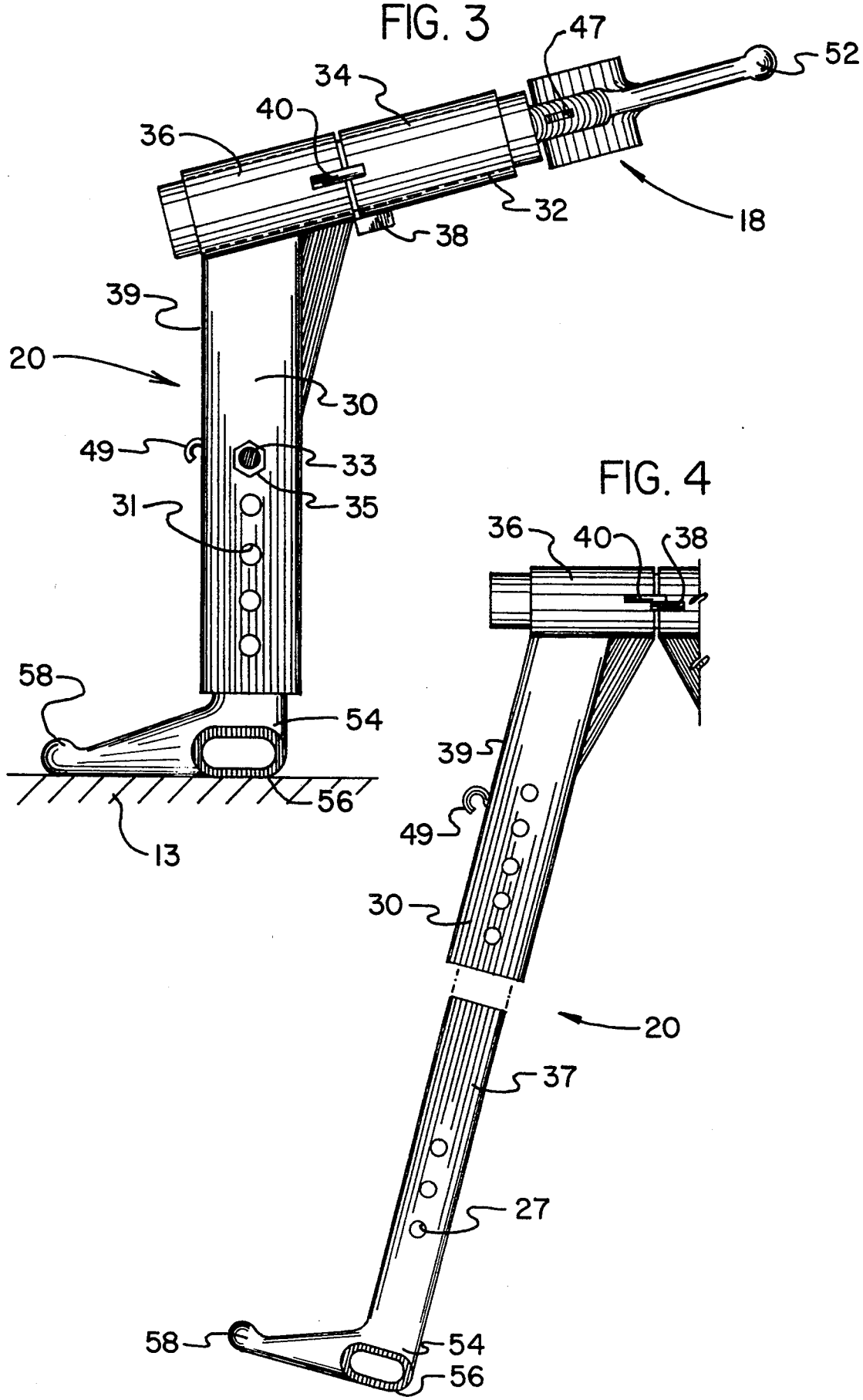

MOTORCYCLE KICK STAND

BACKGROUND OF THE INVENTION

1. Field of the Invention

The present invention relates generally to kickstands for two-wheeled vehicles, such as motorcycles, and more particularly, to a kick stand apparatus especially adapted to support a two-wheeled vehicle in an upright orientation.

2. Description of the Prior Art

Kick stands for motorcycles, and other two-wheeled vehicles, are well known in the art. Single side kick stands are designed to park the motorcycle in a leaning orientation. Other kick stands, having two opposed legs or a single center stand, often referred to as a "center stand" are designed to park the motorcycle in an upright orientation.

Kick stands designed to support a motorcycle in an upright orientation usually include an assembly of two leg elements that always move and operate together. One leg element prevents the motorcycle from leaning to the right, and the other leg element prevents the motorcycle from leaning to the left.

Use of the type of kick stand that has two leg elements that always move and operate together has a number of advantages over the use of a kick stand assembly having a single leg. One advantage is that the two-legged kick stand assembly provides stability and resistance of the motorcycle falling onto one or the other of its sides. Another advantage is that one of the wheels of the motorcycle can be elevated above the ground. That is, the motorcycle can be supported in the upright position on three support points: on one motorcycle wheel and on two legs of the two-legged kick stand assembly, leaving the second wheel of the motorcycle supported off of the ground surface.

However, a significant disadvantage of the kick stand assembly that has two leg elements that always move and operate together is that a large portion of the weight of the motorcycle must be lifted vertically in order for the two-legged assembly to be lowered under the motorcycle from a retracted position. Motorcycles can be very heavy, and lifting such heavy weights can be very difficult if not impossible for some riders. In this respect, it would be desirable if a two-legged kick stand assembly were provided that did not require lifting a large portion of the weight of the motorcycle vertically in order to place the kick stand in the lowered position from the retracted position.

In using a motorcycle, it is often desirable to be able to conduct maintenance or repair operations on a wheel or tire. To conduct the maintenance or repair operation, conventionally, blocks are placed under the motorcycle in appropriate locations so that the one of the motorcycle wheels can be elevated. In this respect, it would be desirable if the use of extraneous blocks could be avoided and if a kick stand assembly were provided that permitted a wheel or tire to be serviced while the wheel or tire was elevated above ground level and free to rotate while the motorcycle is supported in an upright position.

In addition, it is often desirable to check drive train components on a motorcycle as the drive wheel is being turned by the motor. In order for a drive wheel to turn without moving the motorcycle, it is necessary that the drive wheel be elevated off of the ground surface. In this respect it would be desirable if a kick stand assembly were provided that permitted the drive wheel to be elevated off of the ground surface, permitting inspection of the drive train components as they are running.

If a motorcycle is loaded with a number of items to be carried by the motorcycle, such items may tend to make the loaded motorcycle somewhat top heavy. In this respect, a motorcycle that employs a single leg kick stand may have to be unloaded in order to work on the motorcycle. Otherwise, the motorcycle may have tendency to fall over when being worked on. In this respect, it would be desirable if the motorcycle could be supported by a kick stand so that it need not be unloaded in order to perform maintenance or repair functions.

Motorcycles that employ kick stands having a single leg are often unstable when parked in a leaning orientation. This is especially so when the motorcycle is parked on soft dirt or soft asphalt, such as in very hot weather. In this respect, it would be desirable if a motorcycle kick stand were provided that enhances the stability of a motorcycle that is parked on soft soil or soft asphalt.

Motorcycles are often used to pull small trailers especially designed to connect to and be pulled by the motorcycle. The operations of connecting the trailer to the motorcycle and disconnecting the trailer from the motorcycle are difficult to carry out when a single leg kick stand is used, and the motorcycle leans to one side when the motorcycle is parked. When the motorcycle is leaning to one side, the connection between the trailer and the motorcycle is out of alignment. The lack of proper alignment complicates the connection of disconnection. In this respect, it would be desirable if a motorcycle kick stand apparatus were provided that maintained the motorcycle and an attached trailer in proper alignment so that connection of the trailer to and disconnection of the trailer from the motorcycle is facilitated.

A number of kick stands for motorcycles are disclosed in the prior art of U.S. patents. For example, the following patents are known: U.S. Pat. Nos. 4,582,336; 4,723,756; 4,773,665; 4,817,977; and 4,986,557. More specifically, U.S. Pat. No. 4,582,336 discloses a center stand for a motorcycle that is secured to the motorcycle frame and that requires a vertical lifting of the motorcycle in order to lock the support under the motorcycle. It is noted that the center stand has a complex operating mechanism which may be susceptible to unexpected failure and collapse. U.S. Pat. No. 4,723,756 discloses a portable motor cycle stand and lift that employs an extraneous unit, that is not normally connected to the motorcycle. A jack mechanism serves to lift the motorcycle vertically. U.S. Pat. No. 4,773,665 discloses a motorcycle stand that employs four elongate leg members grouped in two pairs of two members. The members of the first pair are in a first plane at an acute or right angle to the members of the second pair in a second plane. U.S. Pat. No. 4,817,977 discloses an electrically operated motorcycle stand. U.S. Pat. No. 4,986,557 discloses a motorcycle stand having a variable length that is determined by the amount of extension of a spring-biased, telescopically moving leg member.

None of the foregoing cited patents solves the problems discussed above. Moreover, it would be desired if a motorcycle kick stand apparatus were provided that is simple in structure and is highly resistant to unexpected collapse.

Thus, while the foregoing body of prior art indicates it to be well known to use side stands and center stands for supporting motorcycles in a parked status, the prior art described above does not teach or suggest a two-legged kick stand assembly that does not require lifting a large portion of the weight of the motorcycle vertically in order to place the kick stand in the lowered position from the retracted position. Also, the prior art does not provide a kick stand assembly that permits a wheel or tire to be serviced while the wheel or tire is elevated above ground level and free to rotate while the motorcycle is supported in an upright position. The prior art does not provide an easily operated kick stand assembly that permits the drive wheel to be elevated off of the ground surface, permitting inspection of the drive train components as they are running. In addition, the prior art does not provide an easily operated motorcycle kick stand apparatus which supports the motorcycle in such a way that the motorcycle need not be unloaded in order to perform maintenance or repair functions. The prior art does not provide a motorcycle kick stand that enhances the stability of a motorcycle that is parked on soft soil or soft asphalt. Neither does the prior art provide an easily operated motorcycle kick stand apparatus that maintains the motorcycle and an attached trailer in proper alignment so that connection of the trailer to and disconnection of the trailer from the motorcycle is facilitated. Also, the prior art does not provide an easily operated motorcycle kick stand apparatus that is simple in structure and is highly resistant to unexpected collapse. The foregoing disadvantages are overcome by the unique motorcycle kick stand apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved kick stand apparatus for a two-wheeled vehicle, such as a motorcycle. The apparatus includes an independently operable, first leg assembly, connected to the vehicle and capable of being placed in a lowered position or in a retracted position by an operator's foot, for preventing the vehicle from falling onto the first side when the vehicle is parked. The apparatus also includes an independently operable, second leg assembly, connected to the vehicle and capable of being placed in a lowered position or in a retracted position by an operator's foot, for preventing the vehicle from falling onto the second side when the vehicle is parked. When both the first leg assembly and the second leg assembly are in a lowered position, together they are capable of maintaining the parked vehicle in an upright orientation.

In employing the apparatus, a leg member of the first leg assembly is lowered from a retracted position. The vehicle is leaned toward the lowered leg member of the first leg assembly, and the vehicle is permitted to rest in a first rest position upon a foot of the first leg assembly. Then, a leg member of the second leg assembly is lowered from a retracted position. Then, using a sideways rocking motion, the vehicle is moved from the first rest position to a second rest position wherein the vehicle rests upon both the lowered leg member of the second leg assembly and the lowered leg member of the first leg assembly. In the second rest position, the vehicle is maintained in an upright orientation by the lowered leg members of both the first and second leg assemblies.

The motorcycle kick stand apparatus may also include respective locking assemblies, connected respectively to the first leg assembly and the second leg assembly, for locking the first leg assembly and the second leg assembly in a lowered position, respectively.

The first leg assembly may include a first foot element which includes a first heel portion and a first toe portion. The second leg assembly may include a second foot element which includes a second heel portion and a second toe portion. The respective first and second toe portions prevent the vehicle from falling over when the vehicle is in a leaning position, and the respective first and second heel portions prevent the vehicle from moving out of an upright position, when the respective first leg assembly and the second leg assembly are in a lowered position.

The first leg assembly has a predetermined length, and the second leg assembly has a predetermined length. The length of the first leg assembly and the length of the second leg assembly may have a first length. With the first length, when the vehicle is supported in an upright orientation by both the first and second leg assemblies, one of the wheels of the vehicle is elevated above the ground surface, and the other of the wheels is on the ground surface.

Alternatively, the length of the first leg assembly and the length of the second leg assembly can have a second length. The second length is shorter than the first length. With the second length, the vehicle is supported in an upright orientation by both the first and second leg assemblies, and both of the wheels of the vehicle are on the ground surface.

Both the first and second leg assemblies include means for adjusting their respective lengths. Generally, the two-wheeled vehicle has a first frame member and a second frame member. The first leg assembly may be connected to the first frame member, and the second leg assembly may be connected to the second frame member. Alternatively, the first leg assembly and the second leg assembly may be supported on a common shaft, in a longitudinal arrangement with respect to a longitudinal axis of the shaft. The first leg assembly may include a first hinge member supported by the shaft; and the second leg assembly may include a second hinge member supported by the shaft.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining in considerable detail several preferred embodiments of the invention, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved motorcycle kick stand apparatus which has all of the advantages of the prior art and none of the disadvantages.

It is another object of the present invention to provide a new and improved motorcycle kick stand apparatus which may be easily and efficiently manufactured and marketed.

It is a further object of the present invention to provide a new and improved motorcycle kick stand apparatus which is of durable and reliable construction.

An even further object of the present invention is to provide a new and improved motorcycle kick stand apparatus which is susceptible of a low cost of manufacture with regard to both materials and labor, and which accordingly is then susceptible of low prices of sale to the consuming public, thereby making such motorcycle kick stand apparatus available to the buying public.

Still yet a further object of the present invention is to provide a new and improved motorcycle kick stand apparatus that does not require lifting a large portion of the weight of the motorcycle vertically in order to place the kick stand in the lowered position from the retracted position.

Still another object of the present invention is to provide a new and improved motorcycle kick stand apparatus that is safer to use than prior art kick stands because it does not require the motorcycle to be pushed off a pair of extended legs in order to retract the kick stand.

Still another object of the present invention is to provide a new and improved motorcycle kick stand apparatus that permits a wheel or tire to be serviced while the wheel or tire is elevated above ground level and free to rotate while the motorcycle is supported in an upright position.

Yet another object of the present invention is to provide a new and improved motorcycle kick stand apparatus that permits the drive wheel to be elevated off of the ground surface, allowing inspection of the drive train components as they are running.

Even another object of the present invention is to provide a new and improved motorcycle kick stand apparatus that supports the motorcycle in such a way that the motorcycle need not be unloaded in order to perform maintenance or repair functions.

Still a further object of the present invention is to provide a new and improved motorcycle kick stand apparatus that enhances the stability of a motorcycle that is parked on soft soil or soft asphalt.

Yet another object of the present invention is to provide a new and improved motorcycle kick stand apparatus that maintains the motorcycle and an attached trailer in proper alignment so that connection of the trailer to and disconnection of the trailer from the motorcycle is facilitated.

Still another object of the present invention is to provide a new and improved motorcycle kick stand apparatus that is simple in structure and is highly resistant to unexpected collapse.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a view of the motorcycle kick stand apparatus of FIG. 2 wherein the first leg assembly has been placed in the lowered position, the second leg assembly is in the retracted position, and the motorcycle is leaning to one side over the lowered first leg assembly.

FIG. 4 is a partially exploded view of the embodiment shown in FIG. 2 wherein an adjustable leg element of an adjustable leg assembly has been removed from the remainder of the first leg assembly.

DESCRIPTION OF THE PREFERRED EMBODIMENT

With reference to the drawings, a new and improved motorcycle kick stand apparatus embodying the principles and concepts of the present invention will be described.

Figure 1:
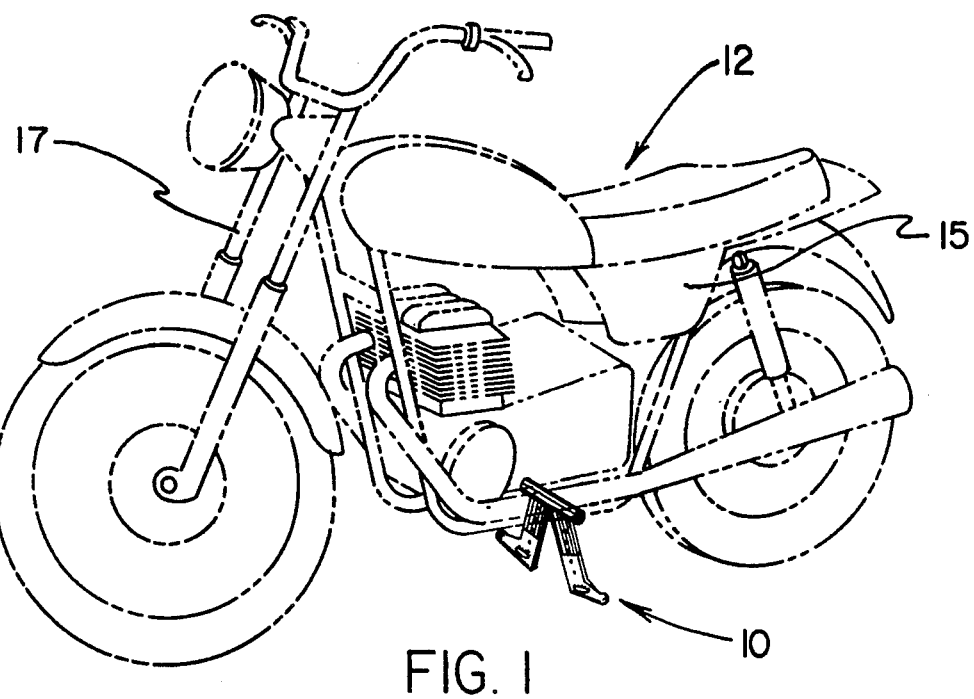
FIG. 1 is a perspective view showing a first preferred embodiment of the motorcycle kick stand apparatus of the invention installed on a motorcycle, and wherein both the first leg assembly and the second leg assembly are in the lowered position.

Turning initially to FIGS. 1-4, there is shown a first exemplary embodiment of the motorcycle kick stand apparatus of the invention generally designated by reference numeral 10. The motorcycle kick stand apparatus 10 is for a motorcycle 12 having a first side 15 and a second side 17, wherein the motorcycle is used for riding on a ground surface 13. The apparatus 10 includes an independently operable, first leg assembly 18 which is connected to the motorcycle 12 and is capable of being placed in a lowered position (as shown in FIG. 1) or in a retracted position by an operator's foot. The first leg assembly 18 prevents the motorcycle 12 from falling onto the first side 15 when the motorcycle 12 is parked.

An independently operable, second leg assembly 20 is connected to the motorcycle 12 and is capable of being placed in a lowered position (as shown in FIG. 1) or in a retracted position by an operator's foot. The second leg assembly 20 prevents the motorcycle 12 from falling onto the second side 17 when the motorcycle 12 is parked. Both the first leg assembly 18 and the second leg assembly 20 serve to maintain the parked motorcycle 12 in an upright orientation (shown in FIG. 1) when both the first leg assembly 18 and the second leg assembly 20 are in the lowered position with either the front wheel raised off the ground, the rear wheel raised off the ground, or both wheels touching the ground, as will be explained in further detail below.

The first leg assembly 18 includes a first foot element 48 which includes a first heel portion 50 and a first toe portion 52. The second leg assembly 20 includes a second foot element 54 which includes a second heel portion 56 and a second toe portion 58. The respective first and second toe portions prevent the motorcycle 12 from falling over when the motorcycle 12 is in a leaning position, and the respective first and second heel portions prevent the motorcycle 12 from moving out of an upright position (shown in FIG. 2), when the respective first leg assembly 18 and the second leg assembly 20 are in a lowered position. More specifically, the respective toe portions provide fulcrum points located a sufficient distance from the center of gravity of the motorcycle to laterally stabilize the motorcycle and prevent the motorcycle from tipping over when in a leaning position. The respective heel portions provide other fulcrum points for preventing the motorcycle from moving out of an upright position once it is placed in the upright position.

Both the first leg assembly 18 and the second leg assembly 20 have a predetermined length. More specifically, the length of the first leg assembly 18 and the length of the second leg assembly 20 may be a first length 19, such that when the motorcycle 12 is supported in an upright orientation, one of the wheels of the motorcycle 12 is elevated above the ground surface 13, and the other wheel is on the ground surface 13. When the leg assemblies are of the first length 19 and the motorcycle 12 is parked, the parked motorcycle 12 is supported on the ground surface 13 by three support points, one motorcycle wheel and two leg assemblies.

Whether the front motorcycle wheel or the rear motorcycle wheel is elevated above the ground surface 13 when the motorcycle kick stand apparatus 10 is in the lowered position depends upon the location of the motorcycle kick stand apparatus 10 with respect to the center of gravity of the motorcycle 12. More specifically, when the motorcycle kick stand apparatus 10 is located between the center of gravity of the motorcycle and the rear wheel, then the rear wheel is elevated when the first and second leg assemblies of the apparatus 10 are in the lowered position. Conversely, when the motorcycle kick stand apparatus 10 is located between the center of gravity of the motorcycle and the front wheel, then the front wheel is elevated when the first and second leg assemblies of the apparatus 10 are in the lowered position.

It is noted that the center of gravity of the motorcycle refers to the center of gravity of the motorcycle and any load that may be carried by the motorcycle. That is, the effective center of gravity may be shifted simply by adding, subtracting, or moving a load carried by the motorcycle either between the motorcycle kick stand apparatus and the front wheel or between the motorcycle kick stand apparatus and the rear wheel.

In accordance with the invention, the kickstand of the present invention may be adjusted relative to the center of gravity of the motorcycle to selectively determine i) whether the front wheel is raised and the rear wheel touches the ground when the first and second leg assemblies are in their lowered position (see FIG. 2), ii) whether the rear wheel is raised and the front wheel touches the ground when the first and second leg assemblies are in their lowered position, or iii) whether both wheels touch the ground when the first and second leg assemblies are in their lowered position.

One such means for adjusting as contemplated by the present invention, comprises independent means for selectively adjusting the effective length of each leg assembly. Another, alternatively preferred adjustment means comprises means for adjusting the angle the first and second leg assemblies make with respect to the vertical axis of the motorcycle when they are in the lowered position as will be explained in fuller detail below in connection with FIG. 5 herein.

More specifically, when the length of the first leg assembly 18 and the length of the second leg assembly 20 are of a second length 21 (which is shorter than the first length 19), then the motorcycle 12 can be supported in an upright orientation with both of the wheels of the motorcycle 12 on the ground surface 13. When the leg assemblies are of the second length 21 and the motorcycle 12 is parked, the parked motorcycle 12 is supported on the ground surface 13 by four support points, two motorcycle wheels and two leg assemblies. By adjusting the length of the leg assemblies to a distance or magnitude between the positions 19 and 21, a relative stable condition may be selected to raise either the front wheel off the ground or the rear wheel off the ground in the lowered position of the first and second leg assemblies, with the exact or precise length for each such desired condition depending upon the size and type of motorcycle. In this connection, it will be appreciated that the leg assembly "effective length" adjustment means contemplated by the present invention enables the kick stand of the present invention to be tailor made to fit virtually any commercially available motorcycle with a "one size fits all" apparatus given the fact that the ground clearance of particular styles or models of motorcycles vary widely.

Figure 2:
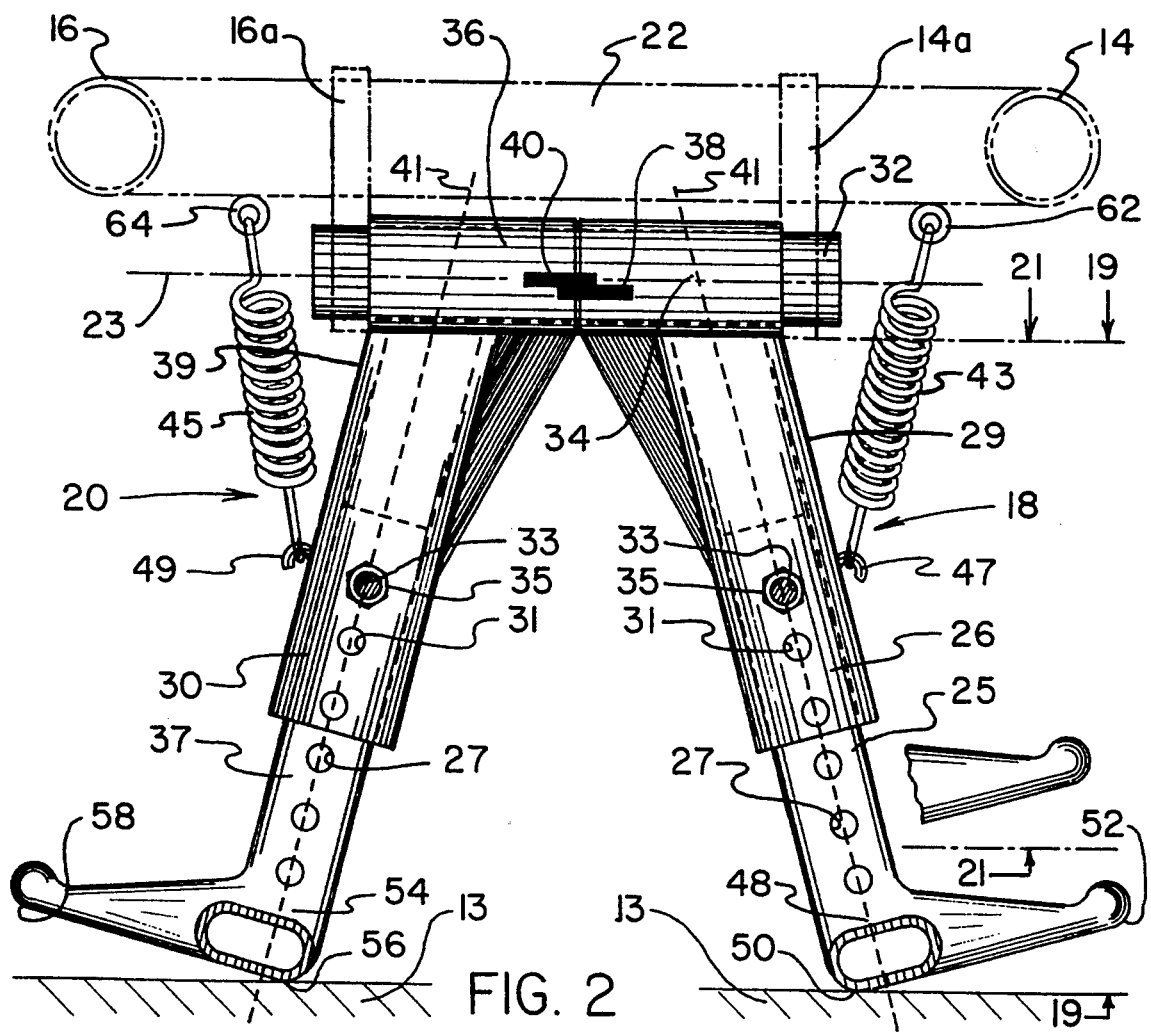
FIG. 2 is an enlarged front view of the embodiment of the invention shown in FIG. 1 wherein both the first leg assembly and the second leg assembly are in the lowered position.

Thus, as best shown in FIG. 2, the first leg assembly 18 includes a first adjustable length assembly for adjusting the length or longitudinal axial extent of the first leg assembly 18, and the second leg assembly 20 includes a second adjustable length assembly for adjusting the length or longitudinal axial extent of the second leg assembly 20.

More specifically, with regard to the first leg assembly 18, the first adjustable length assembly includes a first shin member 25 which includes a plurality of apertures 27. The first shin member 25 is telescopically received in a first cylindrical housing member 29 which includes a plurality of apertures 31. The first shin member 25 is moved into or out of the first cylindrical housing member 29 to achieve the desired adjustable length of the first leg assembly 18. When the desired length is obtained, an appropriate aperture 27 in the first shin member 25 is placed in registration with an appropriate aperture 31 in the first cylindrical housing member 29, and a bolt 33 is placed through the respective apertures 27 and 31, whereby the desired length of the first leg assembly 18 is secured into position. A nut 35 is used to secure the bolt 33 in position.

More specifically, with regard to the second leg assembly 20, the second adjustable length assembly includes a second shin member 37 which includes a plurality of apertures 27. The second shin member 37 is telescopically received in a second cylindrical housing member 39 which includes a plurality of apertures 31. The second shin member 37 is moved into or out of the second cylindrical housing member 39 to achieve the desired adjustable length of the second leg assembly 20. When the desired length is obtained, an appropriate aperture 27 in the second shin member 37 is placed in registration with an appropriate aperture 31 in the second cylindrical housing member 39, and a bolt 33 is placed through the respective apertures 27 and 31, whereby the desired length of the second leg assembly 20 is secured into position. A nut 35 is used to secure the bolt 33 in position.

Figure 5:
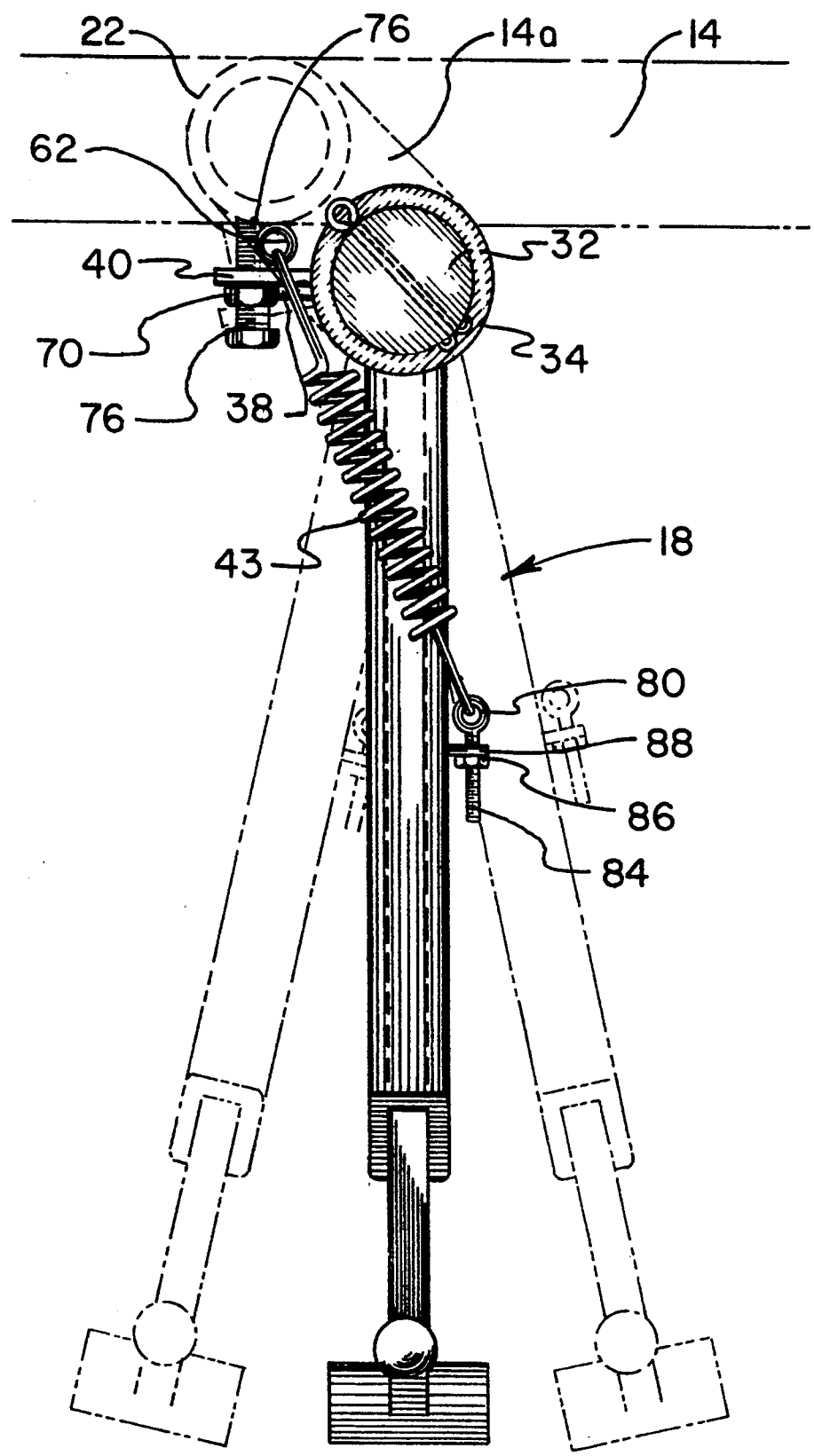
FIG. 5 is a side view of the lowered first leg assembly of FIG. 2.

The motorcycle 12 has a first frame member 14 and a second frame member 16. A cross-beam or transverse strut 22 fixedly extends orthogonally between frame members 14 and 16 and support a pair of integral kick stand mounting tabs 14a and 16a, respectively, each of which has a central opening or aperture therein. As shown in FIG. 5, tabs 14a and 16a extend rearwardly of the motorcycle frame at an angle of approximately 45°. It is to be understood that most motorcycles come with the first frame member, the second frame member, the transverse strut, and the mounting tabs; hence, these parts per se form no part of the present invention and accordingly, are shown in the drawings in broken-line or phantom format.

The first leg assembly 18 and the second leg assembly 20 are supported on a common shaft 32, in a longitudinal arrangement with respect to a longitudinal axis 23 of the shaft 32. The common shaft 32 is connected at one end to the mounting tab 14a and at a second end to the other mounting tab 16a, preferably by suitable means such as a cotter pin inserted between the distal extremity of the shaft and the outside of the tab via a suitable transverse through hole (see, for example FIG. 5). Alternatively, the first leg assembly 18 can be independently connected to the first frame member 14, and the second leg assembly 20 can be independently connected to the second frame member 16.

More specifically, the first leg assembly 18 includes a first hinge member 34 supported by the shaft 32, and the second leg assembly 20 includes a second hinge member 36 supported by the shaft 32. In their preferred form hinge assemblies 34 and 36 comprise cylindrical bushings respectively, integrally attached to cylindrical housing members 29 and 39, respectively, substantially as shown, and which bushings are suitably mounted in a juxtaposed manner on common shaft 32 thereby permitting the leg assemblies 26 and 30 to be selectively rotated about common shaft 23 by suitable engagement of the foot of the motorcycle operator therewith.

The first hinge member 34 furthermore includes an integral first push tab element 38, a portion of which extends laterally over a portion of the second hinge member 36. The second hinge member 36 includes an integral second push tab element 40, a portion of which extends laterally over a portion of the first hinge member 36. Tab elements 38, 40 thus abuttingly engage one another in an overlapping fashion when both the first and the second leg assemblies are in the fully retracted position and the fully lowered position and serve as stop means for preventing lowering or retracting of the first leg assembly before the second leg assembly so as to assure that these parts are actuated in their proper preferred sequence. Thus, by virtue of the arrangement of the stop means tab elements 38 and 40, the second leg assembly must be actuated from its retracted position to its lowered position before the first leg assembly may be actuated from its retracted position to its lowered position. Conversely, when retracting the kick stand of the invention, the stop means tab element arrangement shown and described assures that the first leg assembly must be actuated from its lowered position to its retracted (raised) position before the second leg assembly may be actuated from its lowered position to its retracted position. It will be appreciated that the overlapping of the tab elements comprising the stop means may be reversed in which case the sequence of operating one leg assembly before the other leg assemble may likewise be reversed without departing from the principles of the present invention.

Figure 6:
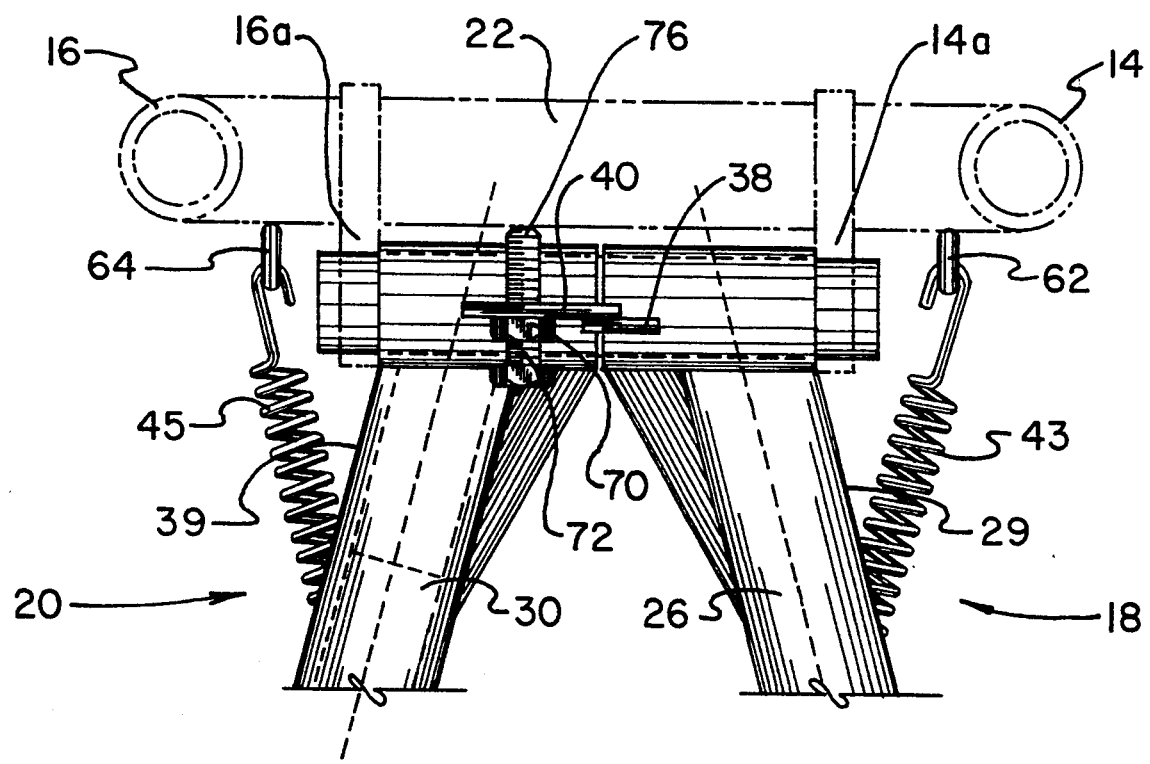
FIG. 6 is a partial front view of an alternative form of the invention showing the adjustable stop means for determining whether the front wheel or the rear wheel of a motorcycle may be raised off the ground when both the first leg assembly and the second leg assembly are in their lowered position.

A first return helical spring 43 is connected between a first hook 47 on the first cylindrical housing member 29 and an eyelet 62 suitably affixed to the bottom of strut 22 substantially as shown in FIGS. 2, 5 and 6. A second return helical spring 45 is connected between a second hook 49 on the second cylindrical housing member 39 and a second eyelet 64 suitably affixed to the bottom of strut 22. Because the respective return springs 43 and 45 are offset mounted with respect to the rotation axis 23, the springs are "overcentered" and serve to keep or securely resiliently bias the respective leg assemblies 18 and 20 in both the retracted position and the lowered position thereby maintaining the stability of the kick stand of the present invention when the first and second leg assemblies are in their two extreme operated conditions. In addition, springs 43 and 45 serve to pull the respective leg assemblies 18 and 20 into their respective retracted positions when weight of the motorcycle is taken off of the respective leg assemblies when the motorcycle is parked, and the leg assemblies are kicked back toward the respective retracted positions. The springs are designed so that the foot pressure of the motorcycle operator is all that it is necessary to actuate the kick stand as disclosed herein.

Other locking mechanisms can be used to lock the respective first and second leg assemblies in the lowered position. Such locking mechanisms are conventionally used for conventional side kick stands for motorcycles and bicycles.

The major components of the motorcycle kick stand apparatus of the invention can be made from inexpensive, strong, and durable metal components.

It is noted that the motorcycle kick stand apparatus 10 of the invention easily may be installed on a motorcycle that is already equipped with a conventional "side stand" type of kick stand (most motorcycles include a conventional side kick stand as original equipment), and may be used in conjunction therewith.

Thus, during preferred operation of the motorcycle kick stand apparatus 10, when the motorcycle 12 is to be parked, the operator, while siring astride the motorcycle, first kicks down the conventional side stand type kick stand that usually is located on the left side of the motorcycle (with reference to facing the front of the bike).

Then, as the operator is still sitting astride the motorcycle, the operator leans the motorcycle slightly toward the first or left side and uses his opposite or right foot to lower a leg member 30 of the second leg assembly 20 from a retracted position on the second side to a lowered position as shown in FIG. 3.

Then, the operator dismounts the motorcycle and stands beside the motorcycle on its first or left side. The operator then leans the motorcycle 12 toward the lowered leg member 30 of the second leg assembly 20 on the second side. The motorcycle 12 is permitted to rest in a first rest position (shown in FIG. 3) upon a foot element 54 of the second leg assembly 20. More specifically, as mentioned above, the second toe portion 58 prevents the motorcycle 12 from falling over when the motorcycle 12 is in the leaning first position shown in FIG. 3.

Then, a leg member 26 of the first leg assembly 18 is lowered from a retracted position by the operator's foot on the first side. Next, using a sideways rocking motion, the motorcycle 12 is moved by the operator from the first rest position shown in FIG. 3 to a second rest position, shown in FIGS. 1 and 2, wherein the motorcycle 12 rests upon both the lowered leg member 30 of the second leg assembly 20 and the lowered leg member 26 of the first leg assembly 18.

In the second rest position, the motorcycle 12 is maintained in an upright orientation by the lowered leg members 26 and 30 of both the first and second leg assemblies 18 and 20. More specifically, the respective first and second heel portions 50 and 56 prevent the motorcycle 12 from moving out of an upright position (shown in FIG. 2), when the respective first leg assembly 18 and the second leg assembly 20 are in a lowered position.

It is noted that the respective first and second foot elements 48 and 54 are perpendicular to and extend away from the longitudinal axes 41 of the respective first and second leg members 26 and 30. In a sense, the foot elements 48 and 54 serve a similar function to outrigger elements in a boat. That is, they greatly add to the stability of the motorcycle 12 and prevent the motorcycle 12 from tipping over whether the motorcycle 12 is in the leaning position, shown in FIG. 3, or the upright position shown in FIGS. 1 and 2. It has been observed that a 4 inch length of the foot element is satisfactory for stabilizing a number of motorcycles. The length of the foot element gives the respective leg assemblies a relatively large "footprint" on the ground surface. The large footprint distributes the weight of the motorcycle and load more evenly on the ground surface and enhances the stability of a motorcycle that is parked on soft soil or soft asphalt.

To return the motorcycle kick stand apparatus 10 to its retracted position, the above-mentioned procedure is repeated in reverse sequence at which juncture the motorcycle operator should be astride the motorcycle and prepared to kick the conventional side stand type kickstand up into its retracted position.

It has been found that adjustment of the kick stand of the invention to have the wheels in a selected position when the motorcycle is parked may be facilitated by the alternatively preferred adjustment means illustrated in FIGS. 5 and 6. As shown therein a nut 70 is orthogonally affixed as by welding, for example, to the underside of tab element 40 with the central threaded opening of nut 70 aligned with a similar opening provided in the tab element 40 (not shown). A suitable male bolt 72 is threadedly engaged through nut 70 and the aligned hole in tab 40 and has its distal end 76 abuttingly engaging the bottom surface of strut 22. By rotating bolt 72 relative to nut 70 and tab 4 the axial position of the point of engagement between distal end 76 and strut may be adjusted to vary the angle the axes of first and second leg assemblies 18 and 20 with respect to a true vertical plane passing perpendicular through FIG. 5 when the leg assemblies are in their lowered position. When bolt 72 is lowered relative to nut 70 and tab element 40, the rest position of the leg assemblies will extend angularly to the right in FIG. 5 resulting in the front wheel being raised off the ground in the parked position. Similarly, when bolt 72 is raised relative to nut 70 and tab element 40, the rest position of the leg assemblies will extend angularly to the left in FIG. 5 resulting in the rear wheel being raised off the ground in the parked position. These two different selectively adjustable positions are indicated by dashed lines in FIG. 5. Obviously a position between these two extremes may be reached (the vertical position shown in solid lines in FIG. 5) resulting in both wheels touching the ground in the parked position. Hence, the precise degree of adjustment desired will be independent of the geometry of a particular motorcycle type and achievable by more or less rotation of adjustment bolt 72 as and when desired.

Figure 7:
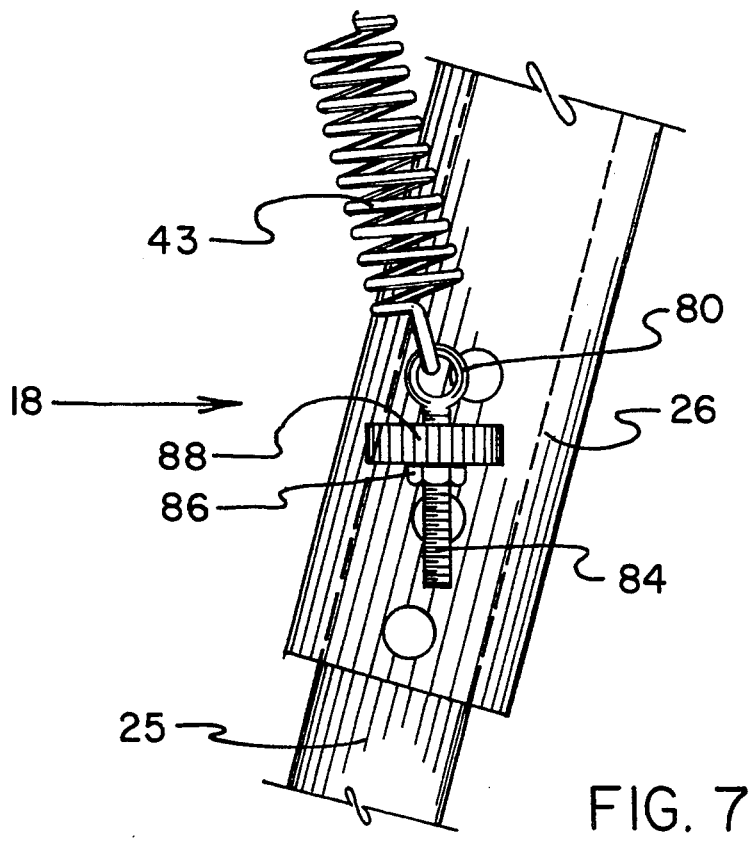
FIG. 7 is a view in elevation of a portion of the second leg assembly showing in detail an alternative arrangement for anchoring the overcenter spring to the leg assembly in order to permit adjustment of the spring's tensioning force.

Alternatively, additional means may be provided to facilitate adjustment in the spring tension afforded by helical springs 43 and 45. Thus, as shown in FIGS. 5 and 7 in lieu of hooks 47 and 49, an axially adjustable eyelet 80 may be provided to anchor the end of each spring wherein the eyelet is suitably affixed to or mounted on a bolt shank 84 threadedly engaging a complimentary nut 86 affixed to a support ear 88 and aligned with a suitable hole through the support ear with the latter being integrally affixed to the outside of cylindrical leg assemblies 26 and 30. By rotating bolt shank 84 relative to nut 86 and support ear 88, the tension in spring 43 and/or spring 45 may be increased or decreased over a limited range if and as desired in an apparent manner.

It is apparent from the above that the present invention accomplishes all of the objects set forth by providing a new and improved motorcycle kick stand apparatus that is low in cost, relatively simple in design and operation, and which may advantageously be used so that lifting a large portion of the weight of the motorcycle vertically is not required in order to place the kick stand in the lowered position from the retracted position. Also, with the invention, a kick stand assembly is provided that permits a wheel or tire to be serviced while the wheel or tire is elevated above ground level and free to rotate while the motorcycle is supported in an upright position. Also, with the invention, a kick stand assembly is provided that permits the drive wheel to be elevated off of the ground surface, allowing inspection of the drive train components as they are running. With the invention, a motorcycle can be supported so that it need not be unloaded in order to perform maintenance or repair functions. With the invention, a motorcycle kick stand is provided that enhances the stability of a motorcycle that is parked on soft soil or soft asphalt. Also, with the invention, a motorcycle kick stand apparatus is provided that maintains the motorcycle and an attached trailer in proper alignment so that connection of the trailer to and disconnection of the trailer from the motorcycle is facilitated. Also, with the invention, a motorcycle kick stand apparatus is provided that is simple in structure and is highly resistant to unexpected collapse. Finally, the invention provides a new and improved motorcycle kick stand apparatus that is safer to use than prior art kick stands because it does not require the motorcycle to be pushed off a pair of extended legs in order to retract the kick stand.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation
of the appended claims so as to encompass all such modifications and equivalents.

What is claimed as being new and desired to be protected by Letters Patent of the United States is as follows:

1. A kick stand apparatus for a two-wheeled vehicle having a frame and a first side and a second side, wherein the vehicle is used for riding on a ground surface, said apparatus comprising:
   independently operable, first leg assembly means, connected to said frame of said two-wheeled vehicle and capable of being placed in a lowered position or in a retracted position by an operator's foot, for preventing the vehicle from falling onto the first side when the vehicle is parked, and
   independently operable, second leg assembly means, connected to said frame of said two-wheeled vehicle and capable of being placed in a lowered position or in a retracted position by an operator's foot, for preventing the vehicle from falling onto the second side when the vehicle is parked,
   wherein both said first leg assembly means and said second leg assembly means are capable of maintaining a parked vehicle in an upright orientation when both said first leg assembly means and said second leg assembly means are in a lowered position,
   wherein said first leg assembly means and said second leg assembly means are supported on a common transverse shaft attached to said frame of said vehicle, said first leg assembly means and said second leg assembly means being in a juxtaposed arrangement on said common transverse shaft with respect to a longitudinal axis of said shaft,
   wherein said first leg assembly means includes a first hinge member supported by said shaft,
   said second leg assembly means includes a second hinge member supported by said shaft,
   said first hinge member includes a first push tab element, a portion of which extends over a portion of said second hinge member, and
   said second hinge member includes a second push tab element such that said second push tab element is adapted to engage said first push tab portion when said first and second leg assembly means are in the retracted position such that said second leg assembly means cannot move from a retracted to a lowered position until said first leg assembly means moves from a retracted to a lowered position.

2. The apparatus described in claim 1, further including:
   resilient locking means, connected respectively to said first leg assembly means and said second leg assembly means, for locking said first leg assembly means and said second leg assembly means in a lowered position, respectively.

3. The apparatus described in claim 1 wherein:
   said first leg assembly means include a first foot element which includes a first heel portion and a first toe portion,
   said second leg assembly means include a second foot element which includes a second heel portion and a second toe portion, and
   said respective first and second toe portions prevent the vehicle from falling over when the vehicle is in a leaning position, and said respective first and second heel portions prevent the vehicle from moving out of an upright position, when said respective first leg assembly means and said second leg assembly means are in a lowered position.

4. The apparatus described in claim 1 wherein:
   said first leg assembly means have a predetermined length, and
   said second leg assembly means have a predetermined length.

5. The apparatus described in claim 4 wherein said length of said first leg assembly means and said length of said second leg assembly means are adjustable.

6. The apparatus described in claim 1 further including means for adjusting the angle said first and second leg assemblies make with said two-wheeled vehicle in the lowered position thereof, said means comprising an axially adjustable limit stop affixed to said first leg assembly and enagageable with said frame of said vehicle when said first leg assembly is in the retracted position.

7. The apparatus described in claim 5 wherein:
   said first leg assembly means include first adjustable length assembly means for adjusting said length of said first leg assembly means, and
   said second leg assembly means include second adjustable length assembly means for adjusting said length of said second leg assembly means.

8. The apparatus described in claim 1 wherein the two-wheeled vehicle is a motorcycle.

* * * * *